US011127154B2

United States Patent
Mandel et al.

(10) Patent No.: US 11,127,154 B2
(45) Date of Patent: Sep. 21, 2021

(54) METHOD AND DEVICE FOR DETERMINING ORIENTATIONS OR FIBER ELEMENTS IN A PART MADE OF COMPOSITE MATERIAL

(71) Applicant: SAFRAN, Paris (FR)

(72) Inventors: Robin Mandel, Moissy-Cramayel (FR); Bastien Tranquart, Moissy-Cramayel (FR)

(73) Assignee: SAFRAN, Paris (FR)

( * ) Notice: Subject to any disclaimer, the term of this patent is extended or adjusted under 35 U.S.C. 154(b) by 124 days.

(21) Appl. No.: 16/467,587

(22) PCT Filed: Dec. 8, 2017

(86) PCT No.: PCT/FR2017/053459
§ 371 (c)(1),
(2) Date: Jun. 7, 2019

(87) PCT Pub. No.: WO2018/104683
PCT Pub. Date: Jun. 14, 2018

(65) Prior Publication Data
US 2020/0349733 A1 Nov. 5, 2020

(30) Foreign Application Priority Data
Dec. 8, 2016 (FR) ..................... 16 62121

(51) Int. Cl.
*G06T 7/73* (2017.01)
*G06T 7/136* (2017.01)
(Continued)

(52) U.S. Cl.
CPC ................. *G06T 7/73* (2017.01); *B64F 5/60* (2017.01); *G06T 7/13* (2017.01); *G06T 7/136* (2017.01);
(Continued)

(58) Field of Classification Search
CPC ............ G06T 7/73; G06T 7/136; G06T 7/13; G06T 2200/04; G06T 2207/30164;
(Continued)

(56) References Cited

U.S. PATENT DOCUMENTS

2006/0255300 A1* 11/2006 Shakespeare .......... G01N 21/86
250/559.37
2016/0247271 A1* 8/2016 Hishida .................. G01B 15/00

OTHER PUBLICATIONS

Lux, J., "Automatic Segmentation and Structural Characterization of Low Density Fiberboards," Image Anal Stereology, vol. 32, 2013, pp. 13-25, XP055375971. (Year: 2013).*
(Continued)

*Primary Examiner* — Michael J Vanchy, Jr.
(74) *Attorney, Agent, or Firm* — Oblon, McClelland, Maier & Neustadt, L.L.P.

(57) ABSTRACT

A method includes obtaining an image of a composite material part, each pixel of the image representing material density at a point of the part represented by that pixel; extracting from the image, for at least one fiber element of the part, a line that is representative of that element along its length; for each extracted line extending this line in width at reference points in compliance with the width of the fiber element, this extension resulting, for each reference point, in extended points; and associating an orientation with each extended point associated with a reference point, which orientation is parallel to the direction of the line at that reference point; evaluating, for a plurality of extended points, a mean orientation of the fiber elements at those points; and determining, for a plurality of orientations, a proportion of elements having those orientations from among the evaluate mean orientations.

11 Claims, 4 Drawing Sheets

(51) Int. Cl.
   *G06T 7/13* (2017.01)
   *B64F 5/60* (2017.01)
(52) U.S. Cl.
   CPC ............... *G06T 2200/04* (2013.01); *G06T 2207/30164* (2013.01); *G06T 2207/30204* (2013.01)
(58) Field of Classification Search
   CPC .......... G06T 2207/30204; G06T 2207/10081; G06T 2207/10116; G06T 2207/30172; G06T 7/70; B64F 5/60
   See application file for complete search history.

(56) References Cited

OTHER PUBLICATIONS

Soltani, P. et al., "3D Fiber Orientation Characterization of Nonwoven Fabrics using X-ray Micro-computed Tomography," World Journal of Textile Engineering and Technology, vol. 1, 2015, pp. 41-47, XP055375988. (Year: 2015).*

International Search Report dated Feb. 9, 2018 in PCT/FR2017/053459 filed on Dec. 8, 2017.

Lux, J., "Automatic Segmentation and Structural Characterization of Low Density Fiberboards," Image Anal Stereology, vol. 32, 2013, pp. 13-25, XP055375971.

Soltani, P. et al., "3D Fiber Orientation Characterization of Nonwoven Fabrics using X-ray Micro-computed Tomography," World Journal of Textile Engineering and Technology, vol. 1, 2015, pp. 41-47, XP055375988.

Huang, X. et al., "Skeleton-based tracing of curved fibers from 3D X-ray microtomographic imaging," Elsevier, Results in Physics, vol. 6, 2016, pp. 170-177, XP055375985.

* cited by examiner

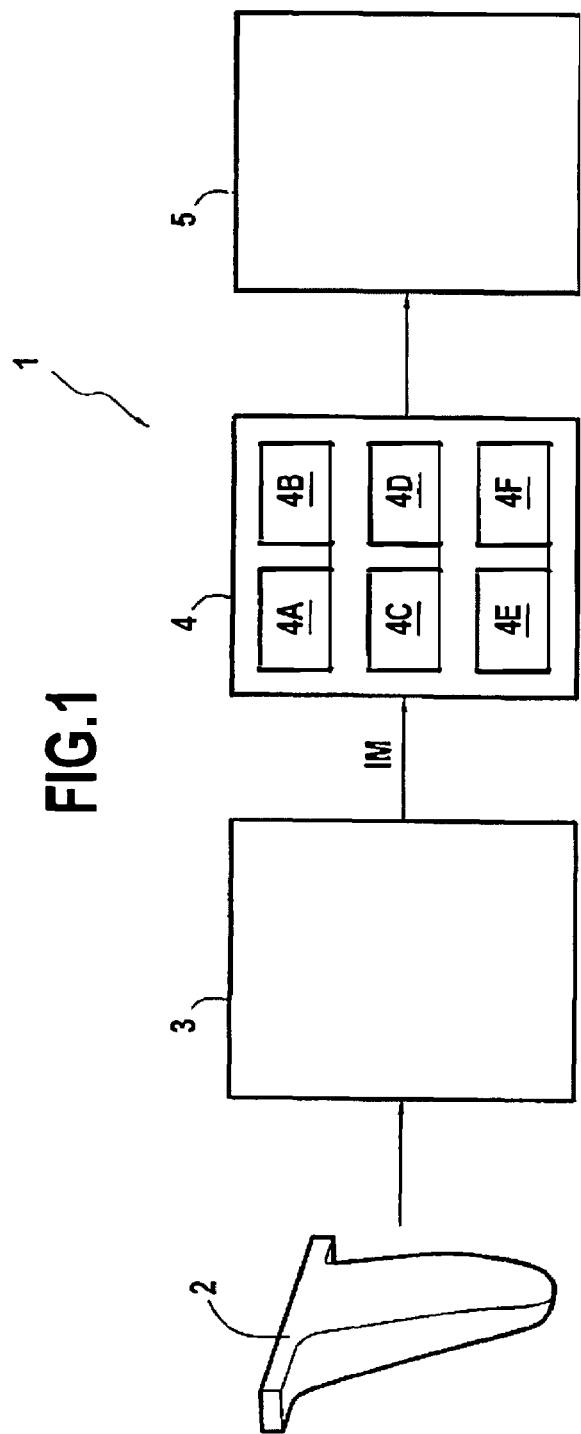
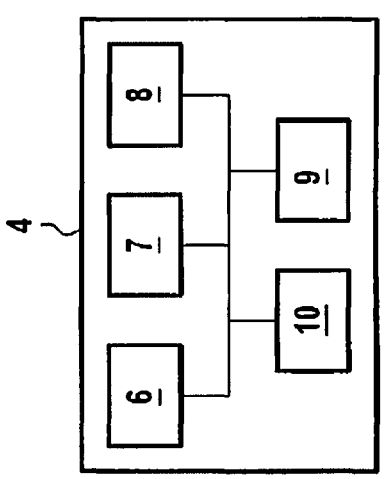

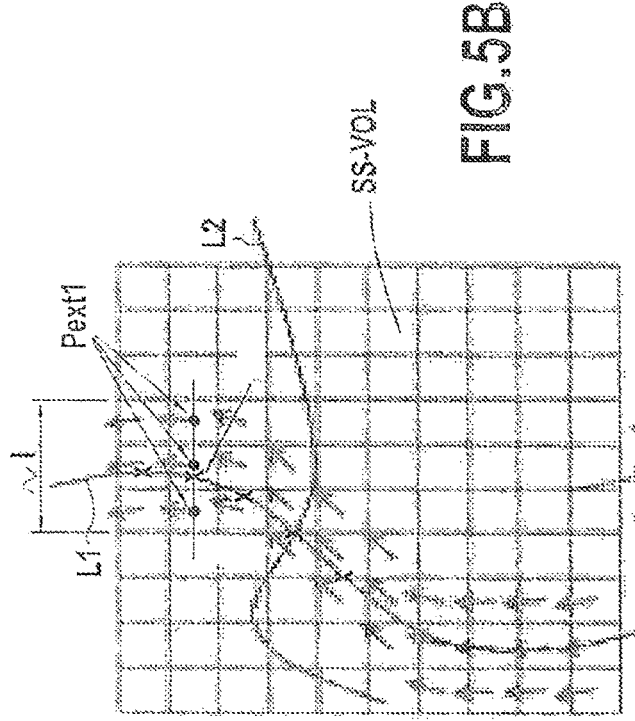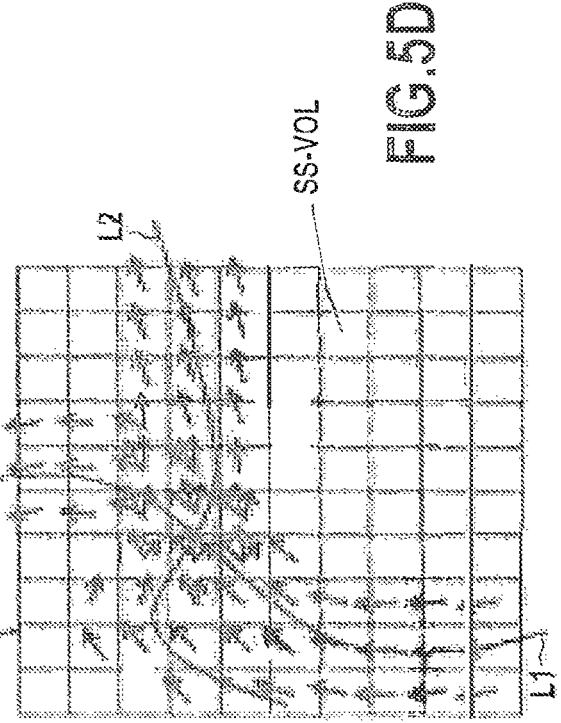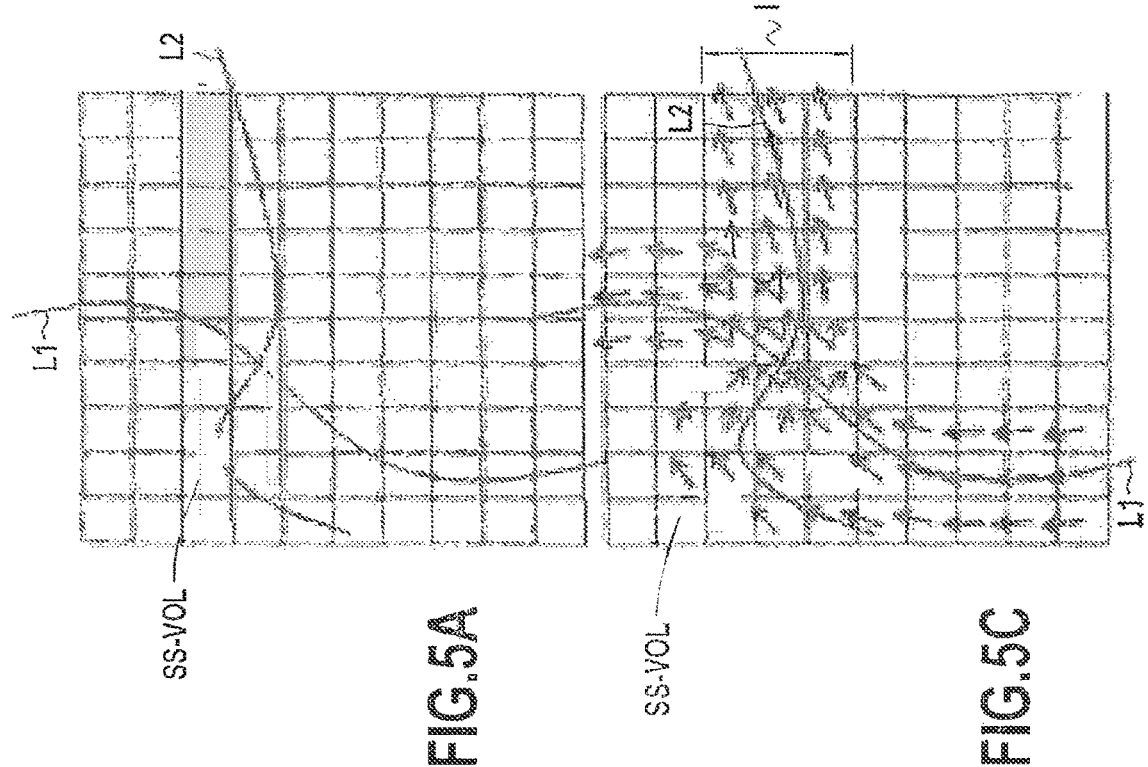

METHOD AND DEVICE FOR DETERMINING ORIENTATIONS OR FIBER ELEMENTS IN A PART MADE OF COMPOSITE MATERIAL

BACKGROUND OF THE INVENTION

The invention relates to the general field of composite materials. It relates more particularly to inspecting parts made of composite material, e.g. such as discontinuous long fiber (DLF) or discontinuous fiber composite (DCF) materials fabricated from pre-impregnated fiber "chips" (e.g. made of glass, carbon, or other fibers) that are unidirectional and randomly tangled. The resin of the composite material, also sometimes referred to as its "matrix", may be thermosetting or thermoplastic.

Such composite materials are particularly well adapted to making parts of complex shapes (e.g. including ribs or projections), of the kind used in particular in the aviation industry or in numerous other mechanical industries. Such parts are fabricated in known manner from preforms that are cut out from a sheet of material made from tangled fiber chips, and then assembled in a mold and subjected to a thermo-compression cycle. The chips may also be hot-injected into the mold.

The performance of such composite materials depends directly on the tangling of the fiber chips, and suffers from intrinsic variability due to the random nature of the microstructure (geometry) of the composite material at chip scale. The tangling depends to a great extent on the method of fabricating the part, which may give rise to creep (i.e. deformation) in the material during thermo-compression. Consequently, it can happen that parts are observed to have mechanical behaviors that differ from the behaviors observed during testing on test pieces, since the fiber chips are differently oriented.

Because of the random nature of the tangling of the fiber chips, composite materials, and in particular DLF materials, thus present behavior that is difficult to predict, which constrains the users of such materials to undertake operations of certifying their parts by testing. Certification campaigns are particularly lengthy and expensive. In addition, it is difficult to proceed by comparison in order to validate other designs, even when very close to the tested part. And even when certification is achieved, it is not uncommon for the manufacturers of parts made of DLF material to need to demonstrate the capabilities of each fabricated part prior to delivering it.

There therefore exists a need for a method that makes it possible to characterize the microstructure of a part made of composite material in order to be in a position specifically to predict its performance, and to do so in a manner that does not present the above-mentioned drawbacks.

OBJECT AND SUMMARY OF THE INVENTION

The present invention satisfies this need in particular by proposing a method of determining orientations of fiber elements assembled in a part made of composite material, the fiber elements having an initial shape that is characterized by a length, a width, and a thickness, the method comprising:
  an obtaining step of obtaining an image of the part, each pixel of the image representing material density at a point of the part represented in the image by that pixel;
  an extraction step of extracting from the image, for at least one fiber element of the part, a line that is representative of the fiber element along all or part of its length in the part;
  for each line extracted from the image:
    an extension step of extending the line in width at a plurality of "reference" points of said line, in compliance with the width of the fiber element of which the line is representative, said extension resulting, for each reference point, in a plurality of "extended" points associated with that reference point; and
    an association step of associating an orientation with each extended point associated with a reference point, which orientation is parallel to the direction of the line at that reference point;
  an evaluation step of evaluating, for a plurality of extended points, a mean orientation of the fiber elements at those points from the orientations associated with the extended points; and
  a determination step of determining, for a plurality of orientations of fiber elements, a proportion of fiber elements having those orientations from the mean orientations as evaluated in this way.

Correspondingly, the invention also provides a determination device for determining the orientations of fiber elements assembled in a part made of composite material, the fiber elements having an initial shape that is characterized by a length, a width, and a thickness, the device comprising:
  an obtaining module suitable for obtaining an image of the part, each pixel of the image representing material density at a point of the part represented in the image by that pixel;
  an extraction module configured to extract from the image, for at least one fiber element of the part, a line that is representative of that fiber element over all or part of its length in the part;
  an extension module configured to extend each line extracted from the image in width at a plurality of "reference" points of said line, in compliance with the width of the fiber element of which the line is representative, said extension resulting for each reference point in a plurality of "extended" points associated with that reference point;
  an association module configured to associate an orientation with each extended point associated with a reference point of a line extracted from the image, which orientation is parallel to the direction of the line at that reference point:
  an evaluation module configured to evaluate, for a plurality of extended points, a mean orientation of the fiber elements at those points from the orientations associated with those extended points; and
  a determination module configured to determine, for a plurality of orientations of the fiber elements, a proportion of fiber elements having their orientations from the mean orientations as evaluated in this way.

The present invention thus proposes characterizing the microstructure of a part made of composite material by determining the orientation of the fiber elements (e.g. chips or more generally fiber elements, e.g. presenting an initial shape in the form of a rectangular parallelepiped characterized by a length, a width, and a thickness) that are randomly tangled in the material, and for determining the portion of tangled elements that have the same orientation. The orientation of the fiber elements in the composite material is a microstructural parameter that, in known manner, specifically has a major impact on the mechanical properties of the composite material.

In accordance with the invention, this orientation is determined for a real mechanical part, such as an aviation part, for example, on the basis of an image representing that part. By way of example, such an image is a three-dimensional tomographic image or a two-dimensional X-ray image in which each pixel (also referred to as a "voxel" for three-dimensional images) represents material density at a point of the part corresponding to the pixel. This type of image has the advantage of providing information that is quite fine about the inside of the part and that can be used directly. It thus makes it possible to extract information about the orientation of the chips within the part merely by simple processing as proposed by the invention.

In a first stage, this simple processing comprises "skeletonizing" the image in order to make it easier to use, where skeletonizing consists in retaining for each chip only a director line that represents the chip longitudinally. This line is a curve in two or three dimensions depending on the image under consideration, and it advantageously constitutes the simplest mathematical representation for the chip. The orientations of the chips are then analyzed from the lines obtained, e.g. by means of a moving box that defines a sub-volume (e.g. a rectangular parallelepiped or of some other shape) or a sub-area, and that is moved over all or part of the volume or the area of the part shown in the image. More particularly, in each sub-volume or sub-area, the length of the line in a given direction is integrated, while taking account of the dimensions of the fiber chips in the or each other direction, during a step referred to as an extension step for extending the line.

By way of illustration, for a two-dimensional image (e.g. an X-ray image), extension is limited to extending the line in width at a plurality of reference points, and doing so in compliance with the width of the fiber elements that is represented by the line. For an image in three dimensions (e.g. a tomographic image), extension comprises extending the line in width at a plurality of reference points in compliance with the width of the fiber element that is represented by the line, and extending the line in thickness at a plurality of reference points in compliance with the thickness of the fiber element that is represented by the line.

The extension step performed in the invention serves to recreate artificially the shape of the fiber chips in the volume or sub-volume or the area or sub-area defined by the box and to associate an orientation therewith at a plurality of "extended" points. It then suffices to estimate the proportion of fiber chips in each three-dimensional direction in order to determine the three-dimensional distribution of fiber chips locally within the sub-volume, which knowledge can subsequently be extended to the entire part by considering other sub-volumes or sub-areas of the part.

Knowledge of the orientations of the chips in the part makes it possible advantageously to feed a digital model modeling the microstructure of the part, e.g. a digital model similar to that described in Document WO 2015/185840. Such a digital model fed with the real data extracted from the part itself (together with a mean statistic) represents the part in realistic manner and makes it possible advantageously to predict the mechanical properties (e.g. stiffness, failure properties, etc.) of the part in reliable manner at all points of the part. By means of the model, the real part can be validated during non-destructive inspection without requiring a mechanical test to be performed on the part, as is necessary at present. In known manner, the term "non-destructive inspection" is used to designate those methods that enable the integrity state and/or the quality of structures (parts) or of materials to be characterized without degrading them.

A preferred but non-limiting application of non-destructive inspection lies in the field of aviation, and more generally in any field where the structures for which it is desired to characterize their state or their quality are themselves expensive and/or where their reliability in operation is critical. The non-destructive inspection may advantageously be performed on the part in question both while it is being fabricated and also while it is in use or during maintenance. The invention thus applies in preferred but non-limiting manner to aviation parts, and more particularly to aviation parts made of DLF (or DFC) type composite materials. It can also be applied to composite materials of other types, such as for example bulk molding compound (BMC) materials or sheet molding compound (SMS) materials. It should be observed that these two types of material are commonly used for making parts of large size having thickness that is small compared with the other dimensions of those parts. For such parts, using tomography is not appropriate; in order to implement the invention it is then preferable to use a two-dimensional X-ray type image of such a part, making it possible to obtain an area orientation map of the part.

By determining the orientations of the fiber chips in the part, the invention also makes it possible to inspect easily any variability in the distribution of chips that might exist between one part and another, and/or relative to orientations that are "nominal" (i.e. reference orientations). This variability is due in particular to the method of fabricating the part: specifically from one part to another, the chips become positioned individually in non-deterministic manner, such that small variations can be observed in the distribution of the chips (concerning orientation or even tangling). Knowledge of the orientations of the fiber chips in a given part enables them to be compared with nominal orientations determined during the design of the part.

The invention thus makes it possible to verify and ensure easily that the method of fabricating parts is repeatable, by using the volumes of the fiber chips as determined by means of the invention, to ensure that each part has a distribution similar to those fiber chips (naturally within a given tolerance threshold). This ensures that each of the parts obtained by the fabrication method under consideration retains performance close to the predetermined nominal performance.

In a particular implementation:
some or all of the fiber elements assembled in the part carry markers along the length of the fiber elements;
the extraction step comprises thresholding the image using a threshold defined on the basis of the density of the material of the markers, the thresholding resulting in an image that represents the markers; and
the lines are extracted from the markers represented in the image that results from the thresholding.

This implementation makes it easier to extract lines representative of the fiber chips, since it relies directly on the markers present on some of the fiber chips. It should be observed that it is not necessary for all of the fiber chips to carry such markers. Naturally, the reliability with which the orientations are determined in this implementation depends on the quantity of markers present in the part and on how they are distributed within the part. The more uniform the distribution of markers and/or the greater the number of markers in the part, the better the reliability of the orientations as estimated by the invention.

In another implementation, applicable in particular when the fiber elements/chips do not have such markers, the extraction step comprises determining boundaries for each fiber element of the part, the lines representative of the fiber elements being extracted from the boundaries as determined in this way.

The invention is easily applied in the absence of markers on the fiber elements.

In a particular implementation, at least the extension step and the association step are performed by using a moving box defining a sub-volume or a sub-area of predefined dimensions that is moved over all or part of the part.

As mentioned above, having recourse to a moving box makes it possible to scan through the entire part and to estimate the orientations of the fiber elements over the entire part. The dimensions of the box under consideration and of the sub-volume or sub-area defined by that box (e.g. a rectangular parallelepiped or a rectangle), and the overlaps between two movements of the moving box over the part, depend on several factors. Thus, defining a sub-volume or a sub-area that is too small runs the risk of not being able to observe a sample of the material that is sufficiently representative, whereas a sub-volume or a sub-area that is too large might fail to identify zones that are anisotropic.

In a particular implementation, the orientations of the fiber elements and the proportions of fiber elements having those mean orientations are stored in an orientation tensor.

In known manner, such an orientation tensor relies on a matrix having three rows and three columns, in which the Eigenvectors represent the main orientation directions of the fiber elements in the part, while the Eigenvalues define the proportions of fiber elements in the part having those directions. This orientation tensor enables the orientations of the fiber elements in the part to be represented graphically by means of three-dimensional ellipsoids or of two-dimensional ellipses having axes of directions that are defined by the Eigenvectors of the tensor, and having lengths that are defined by the Eigenvalues.

In a variant, it is possible to envisage a representation in the form of a map, in a plane panel.

In a particular embodiment, the various steps of the determination method are determined by computer program instructions.

Consequently, the invention also provides a computer program on a data medium, the program being suitable for being performed in a determination device, or more generally in a computer, the program including instructions adapted to performing steps of a determination method as described above.

The program may use any programming language, and may be in the form of source code, of object code, or of code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In another aspect, the invention provides a non-destructive inspection method applied to a composite material part, the composite material comprising an assembly of fiber elements, the inspection method comprising:
   an acquisition step of using a digital imaging system to acquire an image of the part, each pixel of the image representing material density at a point of the part represented in the image by that pixel;
   a determination step of determining the orientations of the fiber elements of the part by performing a determination method of the invention; and
   a non-destructive inspection step performed on the part using the orientations as determined in this way.

Correspondingly, the invention also provides a non-destructive inspection system for use in inspecting a composite material part, the composite material part comprising an assembly of fiber elements, the inspection system comprising:
   a digital imaging system configured to acquire an image of the part, each pixel of the image representing material density at a point of the part represented in the image by that pixel;
   a determination device for determining the orientations of fiber elements of the part of the invention; and
   an inspection device for inspecting the part and configured to use the orientations as determined in this way.

Preferably, the part is an aviation part.

The inspection method and system benefit from the same advantages as the determination method and device of the invention, as mentioned above.

In other implementations and embodiments, it is also possible to envisage that the determination method and device, and the non-destructive inspection method and system of the invention present in combination all or some of the above-mentioned characteristics.

BRIEF DESCRIPTION OF THE DRAWINGS

Other characteristics and advantages of the present invention appear from the following description made with reference to the accompanying drawings, which show an embodiment having no limiting character. In the figures:

FIG. 1 shows a non-destructive inspection system in accordance with the invention, in a particular embodiment;

FIG. 2 shows the hardware architecture of a determination device of the invention forming part of the FIG. 1 non-destructive inspection system;

FIGS. 5A-5D show various treatments performed by the FIG. 2 determination device in a particular implementation.

DETAILED DESCRIPTION OF THE INVENTION

Figure 3:
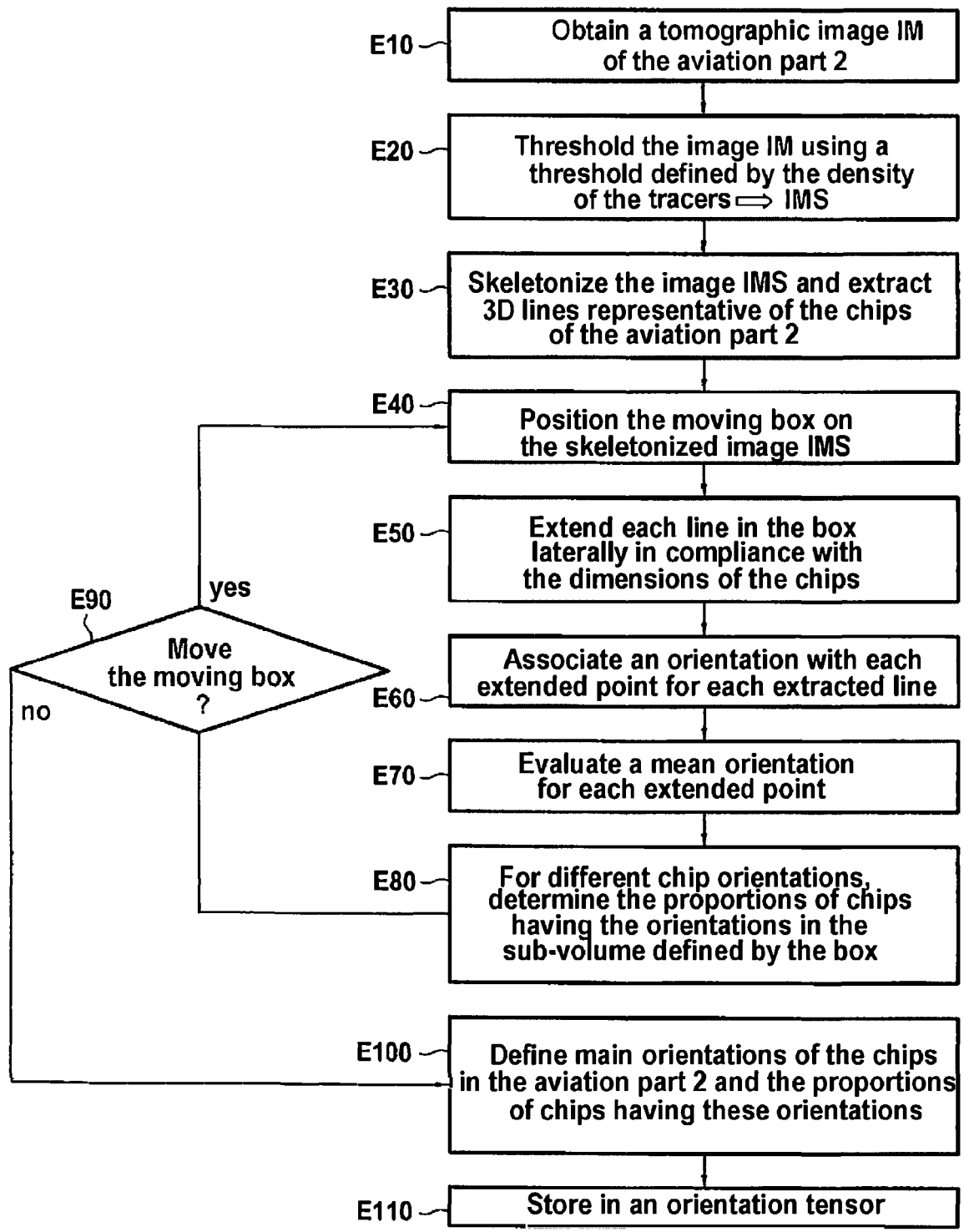
FIG. 3 shows the main steps of a determination method of the invention in a particular implementation that is performed by the FIG. 2 determination device.

FIG. 1 shows a non-destructive inspection system 1 (or NDI system 1) in its environment for the purpose of being used to inspect a part made of composite material.

In the example shown in FIG. 1, this part is an aviation part 2, such as for example a turbine engine blade made of composite material. Nevertheless, no limitation is associated with the nature of the part under consideration that is to be subjected to non-destructive inspection by the NDI system 1. It could be any other type of aviation part, or more generally any other type of mechanical part for which it is desired to inspect compliance, for example.

In the presently-envisaged example, the aviation part 2 is made of DFC type composite material, in other words having discontinuous long fibers and fabricated using "chips" of randomly tangled fibers pre-impregnated with a thermosetting resin (matrix). By way of example, the chips are carbon fiber chips that are impregnated with a carbon resin, and that present an initial shape (i.e. a shape prior to being deformed by the method of fabricating the part, e.g. in a mold) that is substantially in the form of a rectangular parallelepiped defined by a length L, a width $\ell$, and a thickness $\underline{e}$. By way of example, the length L of the chips lies in the range 10 millimeters (mm) to 50 mm, the width $\ell$ is about 10 mm, and the thickness of the chips is about 0.15 mm. The chips constitute fiber elements in the meaning of the invention. In the description below, the terms chips, fiber chips, and fiber elements are used interchangeably to designate the randomly tangled chips in the composite material constituting the aviation part 2.

Naturally, the above values are given purely by way of illustration. In addition, the invention applies to other composite materials made up of fiber elements that are pre-impregnated with resin, such as for example materials constituted by glass fiber chips impregnated with a polymer resin, or any other composite made up of pre-impregnated chips or strands arranged in random manner or in quasi-random manner in a cavity. The invention also applies to fiber elements having an initial shape that is other than that of a rectangular parallelepiped, and that is capable of being characterized by a length L, a width $\ell$, and a thickness $\underline{e}$.

In accordance with the invention, in order to perform non-destructive inspection of the aviation part 2, the NDI system 1 relies on determining the orientations of the tangled chips in the part.

In the embodiment shown in FIG. 1, each tangled chip in the aviation part 2 carries a marker or tracer that extends along the entire length of the chip. By way of example, such a marker is a glass fiber strand or yarn that presents a "color" that is different from the color of the carbon fiber chips used for making up the composite material (or that presents a different level of absorption), and that is inserted in the chip in known manner. Patent application WO 2016/028349 describes an example of inserting and using such markers in a part made of composite material.

In a variant, only some of the tangled chips in the aviation part 2 carries such markers. Preferably, it is ensured that at least 70% of the fiber chips are provided with markers in the aviation part 2, being distributed in balanced manner throughout the part (i.e. so as to avoid having markers concentrated in one location in the part). Nevertheless, the invention can be performed with a lower concentration of markers; under such circumstances, the orientations determined by the invention may be associated with a confidence index representing the proportion of markers present in the part and how they are distributed.

In accordance with the invention, in order to perform non-destructive inspection of the aviation part 2, the NDI system 1 comprises:
a digital imaging system 3 configured to acquire an image of the part. In the example shown in FIG. 1, the digital imaging system 3 is a tomographic system suitable for providing a three-dimensional tomographic image IM of the aviation part 2, each three-dimensional pixel of the image IM (also commonly referred to as a "voxel" for "volume pixel") representing material density at a point occupied by that pixel in the aviation part 2;
a determination device 4 for determining the orientations of the chips in the part 2 in accordance with the invention and suitable for this purpose for using the image IM acquired by the digital imaging system 3; and
an inspection device 5 for inspecting the aviation part 2 and configured to make use of the orientations determined by the device 4 in order to perform non-destructive inspection of the aviation part 2. By way of example, this non-destructive inspection may consist in verifying that the aviation part 2 complies with a predetermined standard, in particular in order to enable the aviation part 2 to be certified, or it may consist in predicting the mechanical performance of the aviation part 2, etc. Examples of non-destructive inspections that can be performed by the inspection device 5 on the basis of the orientations determined by the device 4 of the invention are described in detail below.

In the presently-described embodiment, the device 4 for determining the orientations of the chips in the part 2 is a computer having the hardware architecture that is shown diagrammatically in FIG. 2.

It comprises in particular a processor 6, memories 7-9 (e.g. a ROM and/or a hard disk 7, a random access memory (RAM) 8, and a non-volatile memory 9), and communication means 10. The communication means 10 comprise in particular one or more communication interfaces (e.g. a universal serial bus (USD) port, a network card, etc.) enabling it to communicate firstly with the digital imaging system 3 or with an operator in order to obtain the tomographic image IM of the aviation part 2 as acquired by the digital imaging system 3, and secondly with the inspection device 5 in order to transmit thereto the orientations of the chips that it has determined from the image IM in accordance with the invention.

The ROM and/or the hard disk 7 constitutes a storage medium readable by the processor 6 of the determination device 4 and storing a computer program in accordance with the invention including instructions for executing steps of an orientation determination method of the invention, the steps of the method being described below with reference to FIG. 3, in a particular implementation.

The computer program defines in equivalent manner functional modules of the determination device 4 (these functional modules being software modules in this example), that are suitable for controlling and/or making use of the above-mentioned hardware means 7-10 of the determination device 4. In the presently-described embodiment, these functional modules comprise in particular:
an obtaining module 4A suitable for obtaining the image IM of the aviation part 2 as acquired by the digital imaging system 3;
an extraction module 4B configured to extract from the image IM, for at least one chip in the part, a line that is representative of that chip over all or part of its length in the part;
an extension module 4C configured to extend, in this example in width and in thickness, each line extracted from the image at a plurality of "reference" points of the line so as to digitally reconstruct to some extent the chip represented by the line;

an association module 4D configured to associate each "extended" point resulting from extending the lines extracted from the image with an orientation of the chip at that point;

an evaluation module 4E configured for a plurality of extended points, to evaluate a mean orientation of the chips at those extended points; and a determination module 4F configured to determine, for a plurality of mean orientations as evaluated in this way, the proportion of the extended points that have this mean orientation.

The functions of these modules are described in greater detail below with reference to the steps of the determination method of the invention.

FIG. 3 is a flow chart showing the main steps of the determination method of the invention in a particular implementation in which the method is performed by the FIG. 1 determination device 4 on the basis of a three-dimensional tomographic image IM of the aviation part 2 as acquired by the digital imaging system 3.

Acquiring a tomographic image of an aviation part by means of a digital imaging system is itself known and is not described in detail herein.

The tomographic image IM of the aviation part 2 as acquired by the digital imaging system 3 is obtained by the determination device 4, and more particularly by its obtaining module 4A (step E10). By way of example, it is supplied by the digital imaging system 3 to the determination device 4 via a telecommunications network or by an operator, e.g. via the communication means 10 of the determination device 4.

Figure 4A:
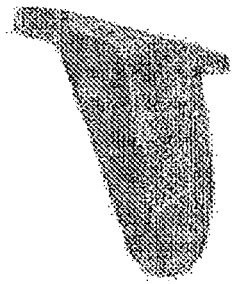
FIGS. 4A-4E show various treatments and images used by the FIG. 2 determination device in a particular implementation.
Figure 4B:
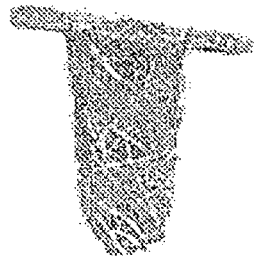

The three-dimensional tomographic image IM of the aviation part 2 provides a measure of the density of the material at each point in the aviation part 2. More particularly, since the image IM 2 is a gray-scale digital image comprising a plurality of voxels (i.e. points or pixels in three dimensions), each voxel of the image IM represents, by means of its associated gray level, the density of the material at the point of the part that is represented by that voxel. FIGS. 4A and 4B show respectively, by way of illustration, a turbine engine blade (an aviation part 2 in the meaning of the invention) and a tomographic image IM of the part.

The tomographic image IM is then processed by the estimation device 4 in order to establish a map of microstructural parameters of the aviation part 2, and more precisely in this example of the preferred orientations of the chips in the part 2.

In the presently-described implementation, and as mentioned above, the tangled chips in the aviation part 2 are marked by means of tracers, which follow the orientations of the chips over their entire length. These tracers (or markers) in this example are made of glass fiber, in other words of a material of greater density that the carbon fiber constituting the chips, and they are used by the determination device 4 in order to perform thresholding on the image IM. Specifically, they are easily discerned (i.e. detected) in the image IM because of their density that is greater than the density of the chips.

Thus, the extraction module 4B of the determination device 4 in this example performs thresholding on the gray levels in the image IM by means of a threshold THR defined on the basis of the density of the material (i.e. in this example, of the glass fiber) that constitutes the tracers that are to be found on the chips (for example THR is taken to be equal to be the density of the glass fiber) (step E20). Performing thresholding on a gray-level coded image is an operation that is itself known and is not described in detail herein. Thresholding the image consists in replacing the gray levels of the pixels in an image one by one as a function of the threshold under consideration (specifically THR): by way of example, if a pixel has a gray level of value greater than the threshold, it is given the value 255 (white), whereas if the gray level of the pixel is below the threshold, it is given the value 0 (black).

Figure 4C:
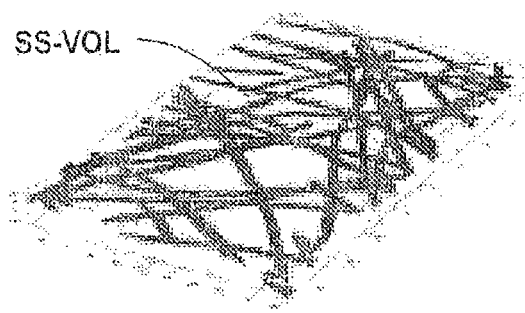

This thresholding gives rise to a black and white binary image IMS that shows only the tracers (and more particularly their directions, i.e. their average lines (also commonly referred to as the "neutral fibers" of the tracers). FIG. 4C shows an extract of the binary image IMS obtained by thresholding from the tomographic image IM of FIG. 4B. This extract represents a sub-volume of the aviation part 2.

The resulting image IMS is then simplified by the determination device 4 in order to make it usable for extracting therefrom the orientations of the chips of the aviation part 2 (step E30). For this purpose, the determination device 4 uses its extraction module 4B to skeletonize the image IMS, and in particular the tracers shown therein. Skeletonization is an operation that is conventionally used in shape analysis and is an analysis tool that is particularly well known in image processing. It consists in reducing a shape to a set of curves, referred to as skeletons, that are centered in the original shape, and that conserve the topological properties of the original shape. By way of example, known skeletonization techniques are techniques of topological thinning, of extracting a distance map, of simulating a flame front, or indeed analytical calculation techniques, e.g. relying on Voronoi diagrams. They are not described in greater detail herein.

The skeletonization performed by the extraction module 4B leads to a "skeleton" line being extracted for each tracer, which line is representative of that tracer (neutral fiber of the tracer). In this example, this line is a three-dimensional curve that represents the tracer associated with a chip in mathematical and simple manner. Each line of a tracer as extracted in this way by the extraction module 4B is thus also representative of the chip (i.e. the neutral fiber of the chip) with which the tracer is associated in the aviation part 2, with this association extending along its entire length.

Figure 4D:
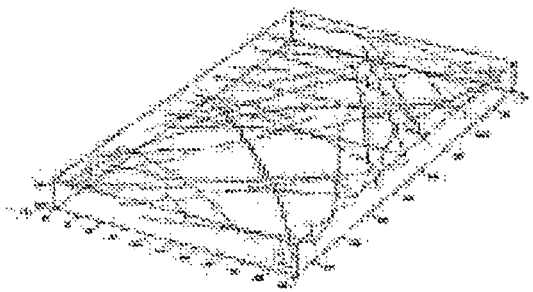

FIG. 4D shows a result of a skeletonization operation performed on the image IMS shown in FIG. 4C.

Then the skeleton formed by the lines extracted by the extraction module 4B is subsequently processed by the determination module 4 in order to obtain the information needed for characterizing the microstructure of the aviation part 2.

In the presently-described implementation, during this processing, the determination device 4 makes use of a moving box defining a sub-volume of predefined dimensions in the aviation part 2, and it moves this box to all or part of the part 2 (step E40). The various positions occupied by the box during its movements are written POSn, for n=1, ..., N, where N is an integer greater than or equal to 1. Each position corresponds to a distinct sub-volume of the aviation part.

In the presently-described embodiment, the moving box defines a sub-volume in the shape of a rectangular parallelepiped. The dimensions of this sub-volume are selected so as to enable a sample of the material of the aviation part 2 to be observed that is sufficiently representative, while also making it possible to observe anisotropic zones in the material, if any. The size is selected to be sufficient to contain a number of tracers that is sufficient for performing statistics. It should be observed that a confidence index may be associated with the number of tracers present in the sub-volume in order to monitor the reliability of the orientations as determined in accordance with the invention. The dimensions of the sub-volume may also depend on the resolution of the orientation map that it is desired to obtain.

In the presently-described implementation, the moving box is moved throughout the volume of the part 2 shown in the tomographic image IM (or at least over all of a predetermined volume of interest in the part 2) so as to cover the entire volume of the part 2 (or the entire volume of interest). In this example, the moving box is moved while providing for overlap on each movement between the volumes contained in the moving box. The overlap dimensions are predetermined: they may be set by default or on the contrary they may be settable parameters. Providing for such overlap makes it possible to avoid losing information and also to smooth the information that is obtained. Furthermore, where applicable, selecting a limited volume of interest that is to be scanned by the moving box may depend on several factors, such as for example the shape of the part 2, the presence or absence of a zone in that part that is critical for its structural strength, for its behavior, etc.

In another implementation, it is possible to envisage a box of another shape; furthermore, it is also possible to envisage moving the moving box in the volume of interest under consideration of the part 2 without overlap between the various movements.

For each line extracted from the image contained in the sub-volume defined by the box while it is in a position POSn, the determination device 4 uses its extension module 4C to extend each line in the width direction and in the thickness direction in compliance the dimensions of the chips (width $\ell$ and thickness $e$ respectively) (step E50). This extension is performed at a plurality of "reference" points of the line corresponding in this example to distinct voxels of the image, and it gives rise to a plurality of "extended" points that are associated with each reference point.

To illustrate this step more clearly, FIG. 5A shows two lines L1 and L2 in an (x, y) plane that represents two tangled chips (or portions of two chips) in the aviation part 2, these two lines being extracted by the extraction module 4B. The grid shown in FIG. 5A defines the voxels of the image contained in the sub-volume SS-VOL under consideration defined by the moving box in its current position POSn.

In FIG. 5B, the line L1 is extended laterally at a plurality of "reference" points selected along the line L1 (e.g. points that are distributed regularly along the line L1, one point per voxel through which the line L1 passes). In FIG. 5B, for simplification purposes, only a few reference points selected along the line L1 are shown by crosses that are referenced Pref1. This extension in width is performed by creating a plurality of "extended" points on either side of the reference points Pref1 on lines that are orthogonal to the direction of the line L1 at each of the reference points Pref1 under consideration, and over a width that is substantially equal to the width □ of the chips. It should be observed that because the image is made discrete in voxels, the line L1 is extended at each reference point Pref1 under consideration over a width that is a multiple of the width of a voxel. This multiple is selected in such a manner as to come as close as possible (above or below) to the with □ of a chip. In the example shown in FIG. 5B, the line L1 is extended over a width comprising three voxels. Each extended point thus corresponds to a distinct voxel in the sub-volume SS-VOL. FIG. 5B shows an example of extended points represented by crosses and referenced Pext1 as obtained for a reference point PRef1.

The extension performed at each reference point selected on the line L1 is parallel to the direction of the line L1 at that reference point, such that this extension in width creates a kind of strip of width substantially equal to $\ell$ that is substantially centered on the line L1 (it is possible that the strip is not exactly centered on the line L1 because of the discrete nature of the voxels and depending on where the neutral line L1 of the tracer is to be found relative to the centroid of the voxel through which it passes), and at all reference points of the line L1 it follows the direction (i.e. the orientation) of the line L1.

In this example, the same operation is performed by the extension module 4C along the thickness e of the chips (not shown in FIG. 5B).

Thereafter, the association module 4D associates each resulting extended point Pext1 that is associated with a reference point Pref1 of the line L1 with an orientation that is parallel to the direction (i.e. the orientation) of the line L1 at this reference point Pref1 (step E60). The orientations associated in this way with each extended point derived from the line L1 are represented in FIG. 5B by arrows.

The extension module 4C and the association module 4D proceed in the same manner for each of the lines contained in the sub-volume defined by the moving box at the position POSn, and in particular for the line L2, as shown in FIG. 5C. It should be observed that certain extended points may be associated with a plurality of orientations corresponding to distinct lines. By way of example, this applies in FIG. 5C to points that are associated with two arrows, one arrow representing the orientation of the line L1 and another arrow representing the orientation of the line L2.

Thereafter, the evaluation module 4E of the determination device 4 determines, for each of the resulting extended points, a mean orientation for the chips at those points (step E70). In this example, this mean orientation is taken by averaging the orientations associated with those points for the various lines processed by the modules 4C and 4D. FIG. 5D uses a discontinuous arrow for each extended point to illustrate the resulting mean orientation. In this figure, it should be observed that when an extended point corresponds to one line only, its mean orientation coincides with the orientation that was associated therewith for that line, with averaging being performed in this situation on one term only.

Thereafter, the determination module 4F of the determination device 4 determines, for each resulting mean orientation, the proportion of extended points (in this example voxels) having this mean orientation in the sub-volume defined by the moving box in position POSn (step E80). For each mean orientation, this proportion is equal to the number of extended points having this mean orientation divided by the total number of extended points obtained for the sub-volume under consideration.

The resulting proportion provides an indication of the proportion of fiber elements located in the sub-volume that extend in each direction of three-dimensional space corresponding to a resulting mean orientation.

Thereafter, the determination device 4 moves the moving box to another position POSn+1, so as to scan in this example through the entire volume of the aviation part 2 (answer "yes" to test step E90), and reiterate above-described steps E40 to E80 over the sub-volume newly defined by the moving box when it is positioned in position POSn+1.

It should be observed that in another implementation, only the steps E50 and E60 are performed using the moving box, while the other steps are performed on the entire volume of the part by aggregating the information obtained for each moving box.

When the entire volume of the part has been scanned (answer "no" to test step E90), the determination device 4 uses its determination module 4F to determine the main orientations of the tangled chips in the aviation part 2, and the proportions of the chips having those orientations (step E100). For this purpose, it aggregates the information obtained in steps E80 for the various positions POS1, . . . , POSN occupied by the moving box, while taking account of overlaps, if any, during the movements of the moving box (an average may then be taken on the proportions obtained that are concerned by overlaps in order to smooth the resulting values).

In the presently-envisaged implementation, the various positions make no provision for overlap, and it then suffice for the determination module 4F to take account of the mean orientations evaluated for each sub-volume defined by the moving box, and the proportions of extended points as determined in association with those various mean orientations (typically by averaging for a given mean orientation the proportions that are obtained in each of the sub-volumes).

The determination module 4F extracts the main orientations of the chips in the aviation part 2 from these mean orientations and the associated proportions, and in this example it stores the main orientations in association with the proportions of chips having those main orientations, in an orientation tensor (step E110). In known manner, such an orientation tensor provides a description of the distribution of orientations in a volume in the form of a matrix having dimensions 3×3. The Eigenvectors of this matrix represent the main directions of the orientations, while the Eigenvalues of the matrix characterize the proportion of elements (chips in this example) having those directions. Such a description serves advantageously to provide a graphical representation of the orientations of the chips in the aviation part by using ellipsoids of axes that are determined from the Eigenvectors (directions of the axes) and from the Eigenvalues (dimensions of the axes).

Figure 4E:
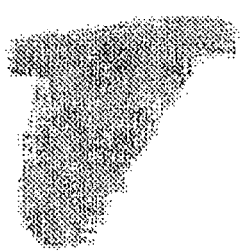

From this tensor, it is also easy to obtain a map of the orientations of the chips throughout the orientation of the aviation part 2. FIG. 4E shows such a map for the blade shown in FIG. 4A. In this map, dark gray denotes an oriented distribution of fiber chips, whereas pale gray denotes anisotropic distribution of fiber chips.

In the presently-described implementation, it should be observed that the markers or tracers are carried by some or all of the tangled chips in the aviation part 2. The presence of these markers facilitates extracting lines representative of the chips, as can be seen from the above.

Nevertheless, the invention applies equally when such markers are not present on the chips. Under such circumstances, the extraction module 4B does not perform thresholding on the image IM (in other words it does not perform above-described steps E20 and E30), but it proceeds directly to skeletonizing the image IM using any of the above-mentioned techniques or using the gradients in the image IM so as to determine the boundaries of each chip shown in the image IM. It should be observed that this skeletonizing is made easier by the fact that the boundaries of the chips are generally richer in resin than the remainder of the chips, and therefore of density that is different compared with the insides of the chips. At the end of this skeletonizing, closed areas are thus obtained that define the chips.

Furthermore, from these closed areas (boundaries) defining the chips, the extraction module 4B extracts a "mean" line (neutral line occupying the centers of the areas as defined in this way and corresponding to the long direction of each area, assuming that the chips are not square in shape), which line is representative of each chip. Thereafter, the steps E40 to E110 are applied on the lines as extracted in this way from the image IM.

In the presently-described implementation, it should be observed that a three-dimensional tomographic image of the aviation part 2 is used and extension is performed in width and in thickness complying with the dimensions of the chips.

Nevertheless, as mentioned above, such a three-dimensional tomographic image is not always suitable for certain composite materials or for certain aviation parts (typically when the parts are thin and of large dimensions, such as a cover, for example). Under such circumstances, it is still possible to apply the invention while using a two-dimensional image of the part, e.g. obtained by X-raying the part. In addition, it is possible during step E50 to perform extension of the lines representative of the fiber chips extracted from the image in the width direction only, in particular when the thickness of the chips is negligible compared with their other dimensions. Specifically, for the above-mentioned parts that are thin and of large dimensions, it can be assumed that the fiber chips are plane (even if their orientation in the plane may vary along the mean line). This assumption is particularly well satisfied when the fiber chips are themselves thin, and present a tongue-like shape (i.e. chips that are very thin and that present one dimension that is greater than the other in a plane) or of the thread type (e.g. as for BMC materials). This assumption is particularly applicable to fiber chips for which there exists a ratio of at least 10 to 100 between the greatest and the smallest dimension.

As mentioned above, the orientations of the chips of the aviation part 2 as determined in this way by the determination device 4 from the tomographic image IM enable the NDI system 1 to perform non-destructive inspection of the aviation part 2.

Figure 6:
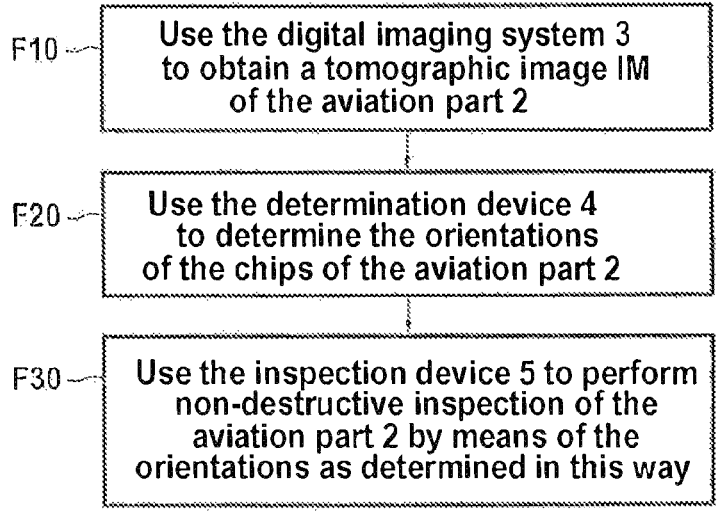
FIG. 6 shows the main steps of a non-destructive inspection method of the invention in a particular implementation that is performed by the FIG. 1 system.

FIG. 6 shows the main steps of a non-destructive inspection method performed by the NDI system 1 shown in FIG. 1 in a particular implementation.

In this method, a tomographic image of the aviation part 2 (e.g. the above-described image IM) is acquired by the digital imaging system 3 (step F10). As described above, this image IM is a three-dimensional gray-scale coded digital image, with each voxel of the image representing material density in the aviation part 2 at the point represented by the voxel.

This image IM is supplied to the orientation determination device 4. The determination device 4 uses the image IM to determine the orientations of the tangled chips in the material constituting the aviation part 2 in accordance with the determination method described above with reference to FIGS. 3 to 5. The orientations as determined in this way are supplied to the inspection device 5, e.g. in the form of an orientation tensor.

The inspection device 5 performs non-destructive inspection of the aviation part 2 by using the orientations as supplied in this way (step F30).

This inspection may take various forms.

Thus, the orientations as determined in this way may be input to a digital model serving to reconstruct a representative elementary volume (REV) of the microstructure of the material of the aviation part 2, as described in Document WO 2015/185840. Such a digital model fed with real orientation data extracted in accordance with the invention from the part 2 itself, as contrasted with some average statistic, provides a very realistic representation of the part 2. This representation, when subjected to finite element analysis, then advantageously serves to predict in reliable manner the mechanical properties (e.g. stiffness, failure properties) of the part at all points thereof. By means of this model, the real part can thus be validated while using non-destructive inspection, as contrasted with performing a mechanical test on the part as is necessary at present.

Another form of non-destructive inspection performed by the inspection device 5 may consist in estimating deviations in the orientations of parts leaving production compared with the nominal orientations (and a nominal variability) that were used by designing the part. For this purpose, the inspection device 5 can evaluate a difference norm between the orientation tensor supplied by the determination device 4 (e.g. for all of the parts or for each sub-volume defined by the moving box in a given position) and the tensor of the nominal orientations. This type of inspection makes it possible to ensure that the method of fabricating the aviation part is repeatable.

Yet another form of non-destructive inspection may consist in detecting departures that might appear during fabrication of a part, e.g. such as an abnormal local distribution in the orientations of the chips, the appearance of pores, or of indications concerning metal inclusions.

Naturally, yet more inspections can be envisaged on the basis of the orientations supplied by the determination device 4 of the invention. The technique of determining orientations as supplied by the invention is a software technique that leads to a significant saving in time and ease of implementation compared with presently-existing inspection techniques that are based essentially on performing mechanical tests on parts. This serves to reduce uncertainty concerning the inspections performed, thereby minimizing risks, while lightening the structures needed for such inspections. Advantageously, the invention also makes it possible to demonstrate easily that the method of fabricating parts is repeatable.

The invention claimed is:

1. A method of determining orientations of fiber elements assembled in a part made of composite material, said fiber elements having an initial shape that is characterized by a length, a width, and a thickness, said method comprising:
    obtaining an image of the part, each pixel of the image representing material density at a point of the part represented in the image by that pixel;
    extracting from the image, for each of a plurality of fiber elements of the part, a line that is representative of the fiber element along its length in the part;
    for each line extracted from the image:
        extending the line in width at a plurality of reference points of said line, in compliance with the width of the fiber element of which the line is representative, said extension resulting, for each reference point, in a plurality of extended points associated with that reference point; and
        associating an orientation with each extended point associated with a reference point, which orientation is parallel to the direction of the line at that reference point;
    evaluating, for a plurality of extended points, a mean orientation of the plurality of fiber elements at said plurality of extended points from the orientations associated with the extended points; and
    determining, for each of the evaluated mean orientations, a proportion of fiber elements having said mean orientation.

2. The method according to claim 1, wherein the image of the part is a three-dimensional image and said extending further comprises extending the line at said plurality of reference points in thickness in compliance with the thickness of the fiber element of which the line is representative.

3. The method according to claim 1, wherein:
    some or all of the fiber elements assembled in the part carry markers along the length of the fiber elements;
    said extracting comprises thresholding the image using a threshold defined on the basis of the density of the material of said markers, said thresholding resulting in an image that represents said markers; and
    the lines are extracted from the markers represented in the image that results from the thresholding.

4. The method according to claim 1, wherein said extracting comprises determining boundaries for each fiber element of the part, the lines representative of the fiber elements being extracted from the determined boundaries.

5. The method according to claim 1, wherein at least said extending and said associating are performed by using a moving box defining a sub-volume of predefined dimensions that is moved over all or part of the part.

6. The method according to claim 1, wherein the orientations of the fiber elements and the proportions of fiber elements having those mean orientations are stored in an orientation tensor.

7. The method according to claim 1, wherein the image of the part is a tomographic image.

8. A non-destructive inspection method applied to a composite material part, said composite material comprising an assembly of fiber elements, said inspection method comprising:
    using a digital imaging system to acquire an image of the part, each pixel of the image representing material density at a point of the part represented in the image by that pixel;
    determining the orientations of the fiber elements of the part by performing a determination method according to claim 1; and
    performing a non-destructive inspection on the part using the determined orientations.

9. The non-destructive inspection method according to claim 8, wherein the part is an aviation part.

10. A determination device for determining the orientations of fiber elements assembled in a part made of composite material, said fiber elements having an initial shape that is characterized by a length, a width, and a thickness, said device comprising:
    an obtaining module suitable for obtaining an image of the part, each pixel of the image representing material density at a point of the part represented in the image by that pixel;
    an extraction module configured to extract from the image, for at least one fiber element of the part, a line that is representative of that fiber element over all or part of its length in the part;
    an extension module configured to extend each line extracted from the image in width at a plurality of reference points of said line, in compliance with the width of the fiber element of which the line is representative, said extension resulting for each reference point in a plurality of extended points associated with that reference point;

an association module configured to associate an orientation with each extended point associated with a reference point of a line extracted from the image, which orientation is parallel to the direction of the line at that reference point;

an evaluation module configured to evaluate, for a plurality of extended points, a mean orientation of the plurality of fiber elements at said plurality of extended points from the orientations associated with the extended points; and a determination module configured to determine, for each of the evaluated mean orientations, a proportion of fiber elements having said mean orientation.

11. A non-destructive inspection system for use in inspecting a composite material part, said composite material part comprising an assembly of fiber elements, said inspection system comprising:

a digital imaging system configured to acquire an image of the part, each pixel of the image representing material density at a point of the part represented in the image by that pixel;

a determination device for determining the orientations of fiber elements of the part in accordance with claim 10; and an inspection device for inspecting the part and configured to use the orientations as determined in this way.

* * * * *